United States Patent
Bhanage et al.

(10) Patent No.: US 11,832,197 B2
(45) Date of Patent: Nov. 28, 2023

(54) NEIGHBORHOOD MANAGEMENT BETWEEN WIFI AND UNLICENSED SPECTRUM RADIOS

(71) Applicant: Cisco Technology, Inc., San Jose, CA (US)

(72) Inventors: Gautam D. Bhanage, Milpitas, CA (US); Matthew A. Silverman, Shaker Heights, OH (US); Sivadeep R. Kalavakuru, Akron, OH (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 17/305,032

(22) Filed: Jun. 29, 2021

(65) Prior Publication Data

US 2022/0417873 A1    Dec. 29, 2022

(51) Int. Cl.
| | | |
|---|---|---|
| H04W 56/00 | (2009.01) | |
| H04W 8/00 | (2009.01) | |
| H04W 72/12 | (2023.01) | |
| H04W 16/14 | (2009.01) | |

(52) U.S. Cl.
CPC ......... H04W 56/001 (2013.01); H04W 8/005 (2013.01); H04W 16/14 (2013.01); H04W 56/0065 (2013.01); H04W 72/1215 (2013.01)

(58) Field of Classification Search
CPC .................. H04W 56/001; H04W 56/0065
See application file for complete search history.

(56) References Cited

U.S. PATENT DOCUMENTS

| | | | | |
|---|---|---|---|---|
| 2017/0142752 A1* | 5/2017 | Schmidt | ............... | H04L 5/0007 |
| 2017/0223737 A1* | 8/2017 | Patel | ..................... | H04L 5/0048 |
| 2020/0145835 A1 | 5/2020 | Xu et al. | | |
| 2020/0281027 A1* | 9/2020 | Damnjanovic | ... | H04W 74/0891 |
| 2021/0029737 A1 | 1/2021 | Pan et al. | | |

FOREIGN PATENT DOCUMENTS

| | | | |
|---|---|---|---|
| WO | 2019143937 A1 | 7/2019 | |
| WO | 2020092322 A1 | 5/2020 | |
| WO | 2020205792 A1 | 10/2020 | |

OTHER PUBLICATIONS

Gaurang Naik et al., "Next Generation Wi-Fi and 5G NR-U in the 6 GHz Bands: Opportunities & Challanges," arXiv:2006.16534v2, Jul. 30, 2020, 29 pages.

Y. Jiang, J. Guo and Z. Fei, "Performance Analysis of the Coexistence of 5G NR-Unlicensed and Wi-Fi with Mode Selection," 2020 IEEE/CIC International Conference on Communications in China (ICCC), 2020, pp. 953-958, doi: 10.1109/ICCC49849.2020.9238800.

3GPP TR 38.889 v16.0.0 (Dec. 2018), "3rd Generation Partnership Project; Technical Specification Group Radio Access Network; Study on NR-based access to unlicensed spectrum," 119 pages.

* cited by examiner

*Primary Examiner* — Sulaiman Nooristany
(74) *Attorney, Agent, or Firm* — Patterson + Sheridan, LLP

(57) ABSTRACT

Techniques for neighborhood management between WiFi and unlicensed spectrum radios. A wireless access point (AP), including a first radio, identifies a neighboring second radio operating using at least a portion of an unlicensed radio spectrum, based on a time that the AP receives a transmission from the second radio using a frequency within the unlicensed radio spectrum. Transmission between the first radio and the second radio is synchronized by identifying a clock offset between a first clock relating to the first radio and a second clock relating to the second radio.

15 Claims, 7 Drawing Sheets

NEIGHBORHOOD MANAGEMENT BETWEEN WIFI AND UNLICENSED SPECTRUM RADIOS

TECHNICAL FIELD

Embodiments presented in this disclosure generally relate to wireless communication. More specifically, one or more embodiments disclosed herein relate to synchronization and neighborhood management between WiFi and unlicensed spectrum radios.

BACKGROUND

Some radios (e.g., 5G cellular radios) have access to unlicensed radio spectrum (e.g., New Radio Unlicensed (NR-U) spectrum). This unlicensed radio spectrum can, in some circumstances, overlap with existing WiFi radio spectrum used by, for example, wireless access points (APs). For example, NR-U and WiFi radios can overlap across multiple Unlicensed National Information Infrastructure (U-NII) radio bands. This can lead to contention between the NR-U radios and WiFi radios operating in APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
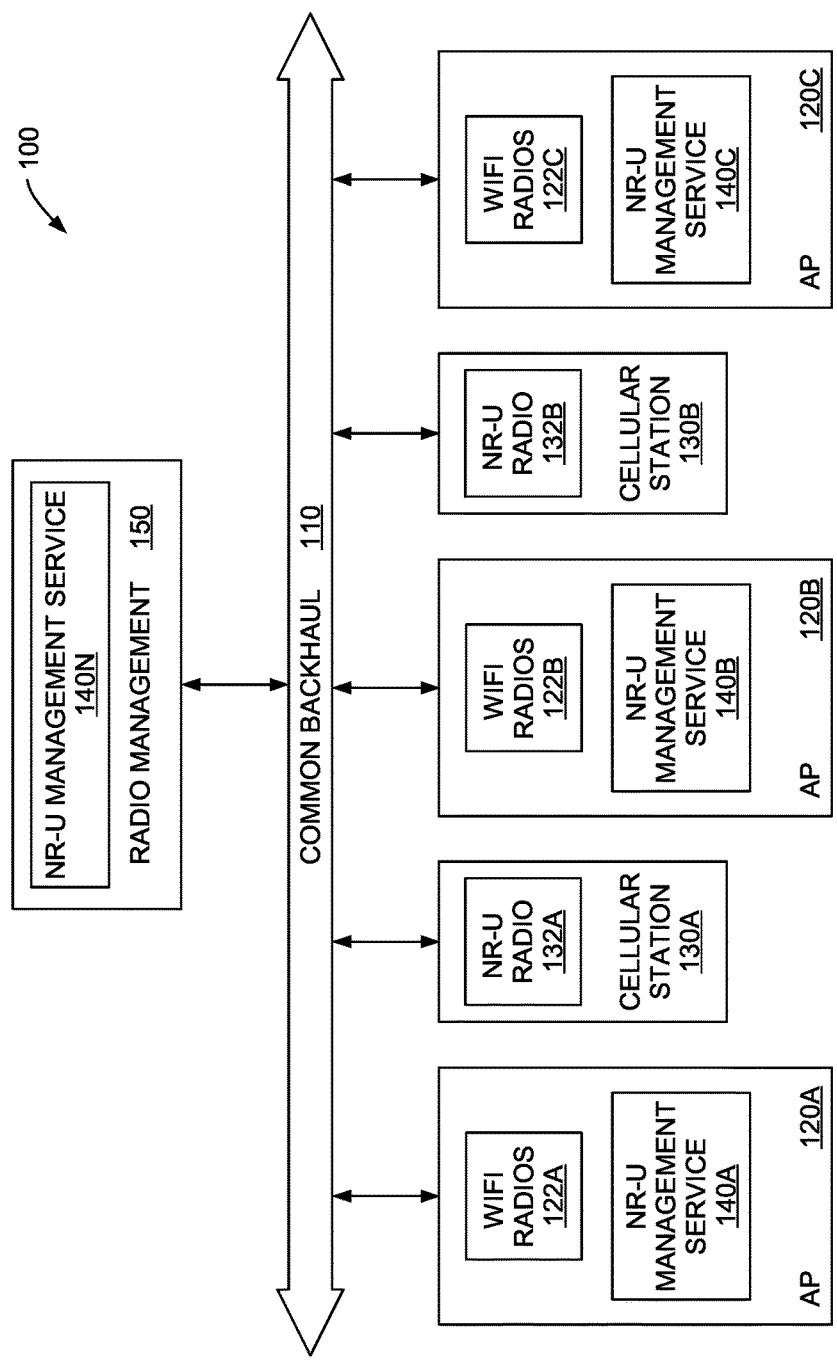
FIG. 1 illustrates neighborhood management between WiFi and unlicensed spectrum radios, according to one embodiment.

Embodiments include a method. The method includes identifying, at a wireless access point (AP) including a first radio, a neighboring second radio operating using at least a portion of an unlicensed radio spectrum, based on a time that the AP receives a transmission from the second radio using a frequency within the unlicensed radio spectrum. The method further includes synchronizing transmission between the first radio and the second radio by identifying a clock offset between a first clock relating to the first radio and a second clock relating to the second radio.

Embodiments further include a system, including a processor and a memory having instructions stored thereon which, when executed on the processor, performs an operation. The operation includes identifying, at a wireless access point (AP) including a first radio, a neighboring second radio operating using at least a portion of an unlicensed radio spectrum, based on a time that the AP receives a transmission from the second radio using a frequency within the unlicensed radio spectrum. The operation further includes synchronizing transmission between the first radio and the second radio by identifying a clock offset between a first clock relating to the first radio and a second clock relating to the second radio.

Embodiments further include a non-transitory computer-readable medium having instructions stored thereon which, when executed by a processor, performs an operation. The operation includes identifying, at a wireless access point (AP) including a first radio, a neighboring second radio operating using at least a portion of an unlicensed radio spectrum, based on a time that the AP receives a transmission from the second radio using a frequency within the unlicensed radio spectrum. The operation further includes synchronizing transmission between the first radio and the second radio by identifying a clock offset between a first clock relating to the first radio and a second clock relating to the second radio.

Example Embodiments

As discussed above, the use of unlicensed radio spectrum (e.g., 5G NR-U) can lead to contention with existing WiFi radios (e.g., used in APs). In an embodiment, this can be improved through neighbor management and synchronization between the WiFi and unlicensed spectrum radios. For example, using existing techniques an AP cannot readily detect a neighbor operating using unlicensed radio spectrum (e.g., a neighboring 5G base station operating using NR-U). This makes it difficult, or impossible, for the AP to coordinate transmission with the neighbor, potentially leading to contention and poor performance.

One or more techniques disclosed herein can allow an AP to detect compatible neighbors operating using unlicensed radio spectrum. For example, an AP can detect compatible cellular stations (e.g., cellular base stations or other infrastructure devices from the same manufacturer as the AP or that are configured to communicate with the AP) operating an NR-U radio that uses unlicensed spectrum. The AP can do this by, for example, using an advertised schedule of radio transmissions from the cellular station, in combination with detected radio transmissions, to determine the likelihood that a given radio is a compatible neighbor to the AP and is operating using unlicensed radio spectrum. In an embodiment, this allows for improved radio transmission by the AP and the neighbor, including improved radio frequency (RF) and channel planning, improved decisions relating to media access control (MAC) aggressiveness, and improved policies for horizontal and vertical handovers.

Further, in an embodiment, a WiFi radio (e.g., in an AP) can synchronize, in time, with identified compatible neighboring radios using unlicensed spectrum. This can allow the WiFi radio and the radio operating in unlicensed spectrum to coordinate transmission and further reduce contention. For example, an AP can use scheduled, and measured, transmissions from the compatible unlicensed radio to determine a clock offset between the AP's WiFi radio and a neighboring radio operating in unlicensed spectrum. The AP can use this clock offset to accurately synchronize, and coordinate, transmissions between its WiFi radio and the neighboring radio.

FIG. 1 illustrates neighborhood management between WiFi and unlicensed spectrum radios, according to one embodiment. In an embodiment, multiple APs 120A, 120B, and 120C are connected to a common backhaul 110 (e.g., using a wired connection). Multiple cellular stations 130A-B are also connected to the common backhaul 110 (e.g., using a wired connection). Further, the common backhaul 110 is connected to radio management 150. In an embodiment, the illustrated radio management 150 includes any number of controller or manager devices and services for the APs 120A-C and the cellular stations 130A-B. For example, the radio management 150 can include wireless local area network (Wi-LAN) controllers, various cellular management components (e.g., 5G components or LTE components), and any other suitable devices and services used to manage or control communication among the APs 120A-C, the cellular stations 130A-B, and any other network devices associated with the common backhaul 110.

In an embodiment, each AP 120A-C includes an associated WiFi radio 122A-C. For example, the AP 120A can include two WiFi radios 122A: a 5 GHz radio and a 2.4 GHz radio. This is merely one example, and each AP can include any suitable number of WiFi radios operating in any suitable radio spectrum. Further, in an embodiment, each AP 120A-C is associated with one or more wireless stations (STAs) (not shown). The STAs can include smartphones, tablets, laptop computers, desktop computers, internet of things (IoT) devices, vehicles, and any other suitable wireless devices.

Further, in an embodiment, each cellular station 130A-B includes an NR-U radio 132A-B. In an embodiment, each NR-U radio 132A-B is configured to operate using unlicensed wireless spectrum (e.g., 5G NR-U spectrum). Each cellular station 130A-B can include multiple radios, including any suitable combination of NR-U radios, radios operating in licensed spectrum, or radios operating in both. The cellular stations 130A-B can be any suitable cellular stations, including cellular base stations and other cellular infrastructure devices.

One or more of the APs 120A-C includes an NR-U management service 140A-C. As discussed further below with regard to FIG. 2, in an embodiment each NR-U management service 140A-C facilitates detection, by the respective AP, of neighboring devices operating using unlicensed radio spectrum (e.g., 5G NR-U spectrum). For example, the AP 120A can used traditional neighborhood discovery techniques (e.g., transmission of neighbor discovery packets (NDPs)) to identify the neighboring APs 120B and 120C. But these techniques typically work only to detect radios of the same type (e.g., a WiFi radio can only identify another WiFi radio using traditional neighborhood discovery techniques). Traditional neighborhood discovery techniques likely will not allow the AP to identify the cellular station 130A as a compatible device operating the NR-U radio 132A.

Instead, the AP 120A can use the NR-U management service 140A to detect the cellular station 130A, and determine a probability that the cellular station 130A is a neighbor to the AP 120A and is operating using unlicensed radio spectrum. Further, the AP 120A can use the NR-U management service 140A to coordinate, and synchronize, radio communication between its WiFi radios 122A and the NR-U radio 132A included in the cellular station 130A. These features are discussed further below, with regard to FIGS. 2-5B.

As discussed above, in an embodiment one or more of the APs 120A-C include an NR-U management service 140A-C. Alternatively, or in addition, the radio management 150 can include an NR-U management service 140N. In an embodiment, the NR-U management service 140N can work instead of, or in combination with, any of the NR-U management services 140A-C to facilitate detection of neighboring devices operating in WiFi and unlicensed spectrum (e.g., the AP 120A and the cellular station 130A), and synchronization of radio transmissions between these devices.

One or more techniques disclosed herein focus on WiFi radios identifying neighboring radios operating using unlicensed spectrum (e.g., NR-U radios). This is merely one example. These techniques can be used to identify any neighboring radios with overlapping spectrum (e.g., where the radios cannot directly communicate using traditional neighborhood discovery techniques).

Figure 2:
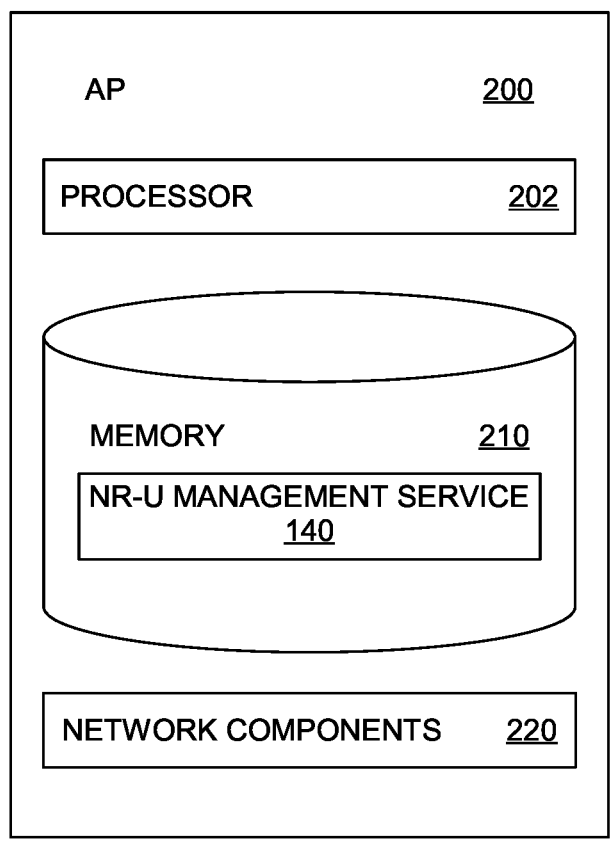
FIG. 2 illustrates an AP supporting neighborhood management and synchronization between WiFi and unlicensed spectrum radios, according to one embodiment.

FIG. 2 illustrates an AP 200 supporting neighborhood management and synchronization between WiFi and unlicensed spectrum radios, according to one embodiment. In an embodiment, the AP 200 corresponds with any of the APs 120A-C illustrated in FIG. 1.

The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the NR-U management service 140 facilitates identification of neighbors operating using WiFi and NR-U radios, and synchronization of radio communications. This is discussed further below with regard to FIGS. 3-6. In an embodiment, the NR-U management service 140 corresponds with any of the NR-U management services 140A-C illustrated in FIG. 1. Further, as discussed above in relation to the NR-U management service 140N illustrated in FIG. 1, using an AP 200 for NR-U management is merely one example. Alternatively, or in addition, radio management devices or services (e.g., the radio management 150 illustrated in FIG. 1) can facilitate NR-U management (e.g., instead of, or in coordination with, one or more APs). In this embodiment the NR-U management service 140 corresponds with the NR-U management service 140N illustrated in FIG. 1.

Figure 3:
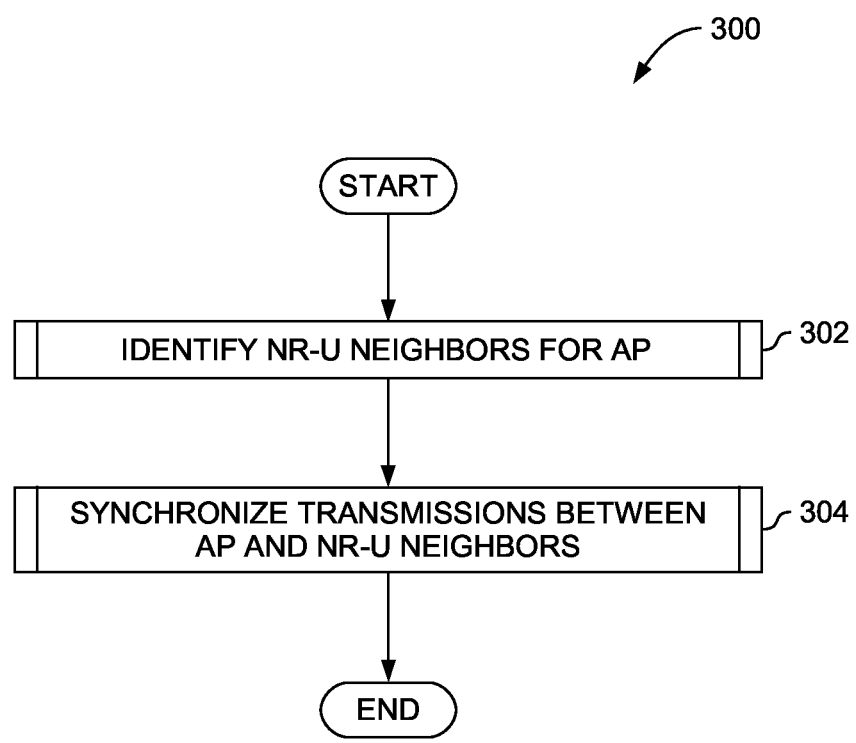
FIG. 3 is a flowchart illustrating neighborhood management and synchronization between WiFi and unlicensed spectrum radios, according to one embodiment.

FIG. 3 is a flowchart 300 illustrating neighborhood management and synchronization between WiFi and unlicensed spectrum radios, according to one embodiment. At block 302 an NR-U management service (e.g., the NR-U management service 140 illustrated in FIGS. 1 and 2) identifies NR-U neighbors for an AP. For example, as discussed above in relation to FIG. 1, an AP (e.g., the AP 120B illustrated in FIG. 1) can include neighbors operating using unlicensed radio spectrum (e.g., the cellular stations 130A and 130B illustrated in FIG. 1). At block 302, the NR-U management service identifies these neighbors by, for example, determining a probability that a given station is an NR-U neighbor based on detecting transmissions from the possible neighbor and comparing the transmissions with a schedule of expected transmissions. This is discussed further below with regard to FIG. 4.

At block 304, the NR-U management service synchronizes transmissions between an AP and its NR-U neighbors. For example, as discussed above, assume at block 302 the NR-U management service has identified two cellular stations (e.g., cellular stations 130A and 130B illustrated in FIG. 1) as likely neighbors for an AP (e.g., the AP 120B illustrated in FIG. 1). At block 304, the NR-U management service can synchronize transmission between this AP and its likely neighbors by, for example, identifying a clock offset between the devices so that scheduled transmissions can be accurately synchronized across the different clocks in the devices. This is discussed further below with regard to FIGS. 5A-B.

Figure 4A:
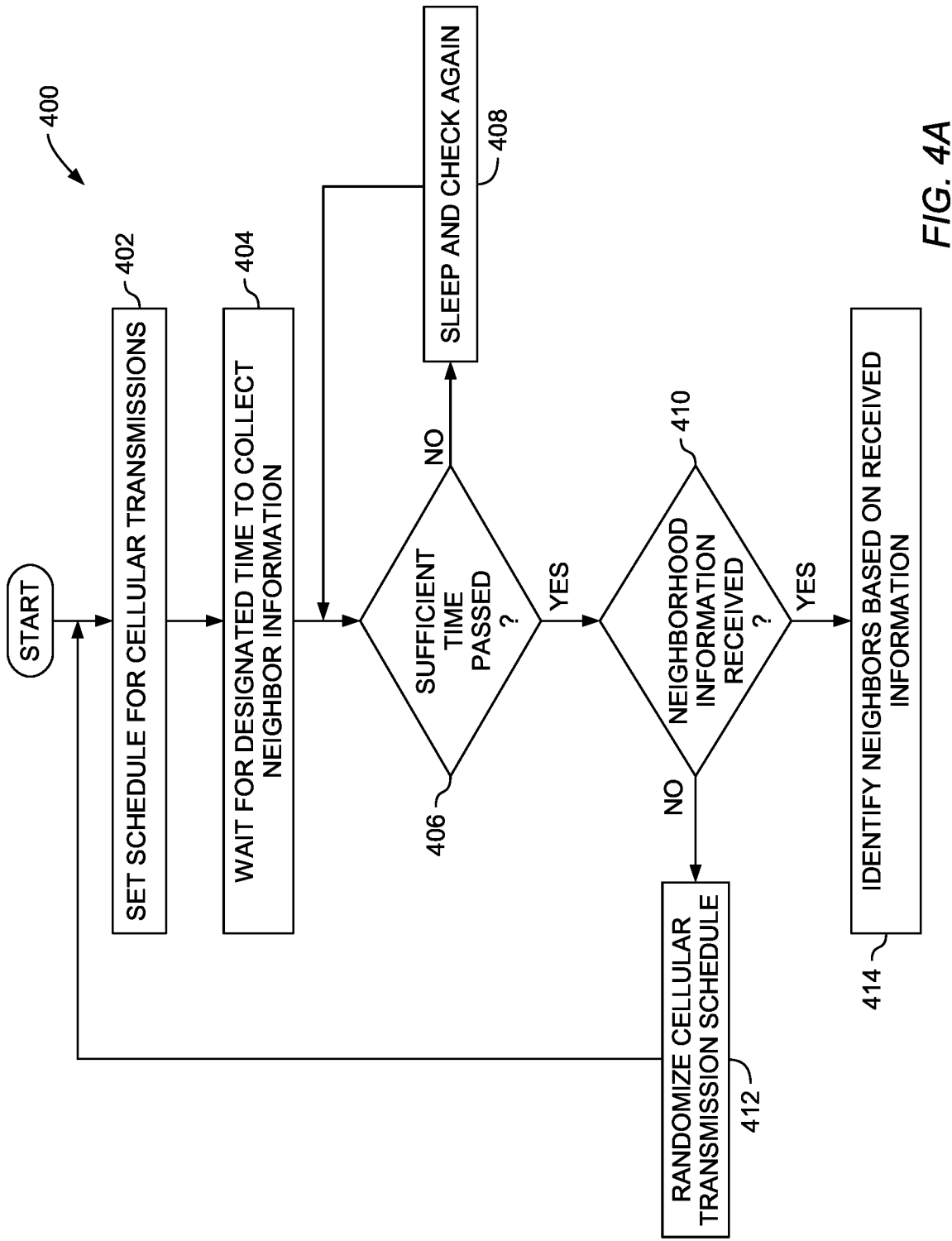
FIG. 4A is a flowchart illustrating neighborhood management between WiFi and unlicensed spectrum radios, according to one embodiment.

FIG. 4A is a flowchart 400 illustrating neighborhood management between WiFi and unlicensed spectrum radios, according to one embodiment. In an embodiment, the flowchart 400 corresponds with block 302 illustrated in FIG. 3. At block 402, an NR-U management service (e.g., the NR-U management service 140 on an AP 120 or in the radio management 150 as illustrated in FIGS. 1 and 2) sets a schedule for cellular transmissions. In an embodiment, each cellular station (e.g., the cellular stations 130A-B illustrated in FIG. 1) transmits during a time window assigned in a suitable schedule (e.g., assigned using radio management 150 illustrated in FIG. 1, or any other suitable component or combination of components). For example, the NR-U management service can provide a starting window and a randomly generated identifier to each cellular station (e.g., each cellular station suitable for discovery), which the NR-U management service and the cellular station can use to determine the transmission window for the station. This is discussed further below with regard to FIG. 4B.

At block 404, the NR-U management service waits for the designated time to collect neighbor information. For example, as discussed further below with regard to FIG. 4B, in an embodiment the cellular stations being discovered can be scheduled to all transmit within an epoch time D, starting at time $T_0$. Each cellular station can use a calculated window within the epoch time D. At block 404, the NR-U management service can wait for epoch time $T_0$.

At block 406, the NR-U management service determines whether sufficient time has passed. For example, the cellular stations can be scheduled to transmit during the epoch D beginning at time $T_0$. At block 404, as discussed above, the NR-U management service waits for time $T_0$. At block 406, the NR-U management service determines whether the epoch D (e.g., D seconds) has passed since time $T_0$. If not, the flow proceeds to block 408. At block 408, the NR-U management service sleeps, and after waking up returns to block 406 to check whether sufficient time has now passed (e.g., D seconds past time $T_0$).

If sufficient time has passed, the flow proceeds to block 410. At block 410, the NR-U management service determines whether neighborhood information has been received. For example, at block 410 the NR-U management service evaluates the transmission received from cellular stations (e.g., using unlicensed spectrum) at a given AP. In an embodiment, the NR-U management service can use fast Fourier transform (FFT) signatures of the received cellular transmissions to identifier transmission from NR-U radios. For example, the NR-U management service can determine that a given transmission originates from an NR-U radio using the FFT signature. The NR-U management service can determine how many cellular stations the NR-U management service has received transmissions from, based on the FFT signatures of the transmissions and the number of identified likely neighbors. For example, one or more cellular stations may not have received a transmission schedule, or interference or another problem may have resulted in the NR-U management service not receiving a transmission from each expected NR-U device.

If the NR-U management service has not received full neighborhood information (e.g., the NR-U management service has not received a transmission from each expected cellular station) the flow proceeds to block 412. For example, the NR-U management service can operate in a radio management device (e.g., radio management 150) and can identify transmissions across all APs associated with the radio management device (e.g., the APs 120A-C). The radio management device can compare the number of radios from which information is received, with the expected number of radios. Alternatively, or in addition, the NR-U management service can operate in a given AP (e.g., the AP 120B) and can identify transmissions from cellular station neighbors for that AP (e.g., the cellular stations 130A-B). The NR-U management service in the AP can identify the expected neighbors (e.g., based on information received from radio management 150 using the common backhaul 110). At block 410, the NR-U management service determines whether it has received a transmission from the expected number of cellular stations.

At block 412, the NR-U management service randomizes the cellular transmission schedule and returns to block 402. For example, as discussed below in relation to FIG. 4B, in an embodiment each cellular station determines its transmission schedule based on a random identifier assigned to the station. At block 412, the NR-U management service can re-assign these random identifiers to change the transmission schedule. This can help to alleviate interference, and other potential transmission problems between the cellular stations.

In an embodiment, at block 410 the NR-U management service can determine whether the time difference between the received transmissions, and the scheduled transmissions, falls within an allowed tolerance. For example, assume a transmission from a cellular station is received by the NR-U management service at time $T(a)$. Further assume that the NR-U management service identifies scheduled transmission times from two radios that are scheduled to be close in time to $T(a)$: transmission from a first cellular station at time $T(1)$ and transmission from a second cellular station at time $T(2)$. The NR-U management service can determine whether it has sufficient confidence to associate the transmission received at time $T(a)$ with either $T(1)$ or $T(2)$ using the equation: $|(T(a)-T(1))-(T(a)-T(2))| \leq \text{TOLERANCE}$. If the NR-U management service does not have sufficient confidence, the flow can proceed to block 412, as discussed above.

Returning to block 410, if the NR-U management service has received full neighborhood information (e.g., the NR-U management service received a transmission from each expected cellular station) and has sufficient confidence in the identified neighbors, the flow proceeds to block 414. At block 414, the NR-U management service identifies neighbors based on the received information. For example, the NR-U management service can compare the time it receives a transmission from a given cellular station (e.g., identified as a transmission from an NR-U radio based on its FFT signature) with the schedule of cellular transmissions. The NR-U management service can determine which received transmission corresponds with which scheduled cellular station by comparing the received transmission time with the scheduled transmission time: a given received transmission is likely associated with the cellular station that was scheduled to transmit at the time closest to the time the transmission is received.

The NR-U management service can then determine extended information about each identified neighbor (e.g., a network identifier and property information). For example, the NR-U management service can communicate with the identified neighbor using a suitable backhaul connection (e.g., the common backhaul 110 illustrated in FIG. 1). For example, the NR-U management service can identify the neighbors as compatible neighbors (e.g., from the same manufacturer as the device operating the NR-U management service or configured to be compatible). The NR-U management service can then communicate with the identified compatible neighbors to identify extended information to use for neighborhood planning and coordination, including channel information, power information, number of hops to the neighbor, and any other suitable information. For example, the NR-U management service can communicate with the identified compatible neighbors through the backhaul, to determine information that would typically be included in an NDP exchanged as part of traditional neighborhood discovery.

In an embodiment, which transmission is associated with which cellular station may be ambiguous based on comparing the received transmission time with the scheduled transmission time. For example, the transmission time for a given cellular station can vary from the scheduled transmission time based on clock variance and inaccuracies in coarse-grained time synchronization techniques (e.g., using network time protocol (NTP) techniques). If the clock of the transmitting cellular station varies from the clock of the receiving NR-U management service, the correlation of cellular stations may be ambiguous.

As another example, when the NR-U management service seeks to identify a large number of cellular stations as potential neighbors, the time period assigned to each cellular station may be relative short, making correlation difficult. In an embodiment, these problems can be solved with a number of possible techniques. As one example, the NR-U management service can run multiple iterations of the techniques illustrated in FIG. 4A, and can compare the results across iterations to improve accuracy. As another example, the cellular stations can be divided into groups for neighborhood detection, lengthening the scheduled transmission windows and improving accuracy of the correlations.

Figure 4B:
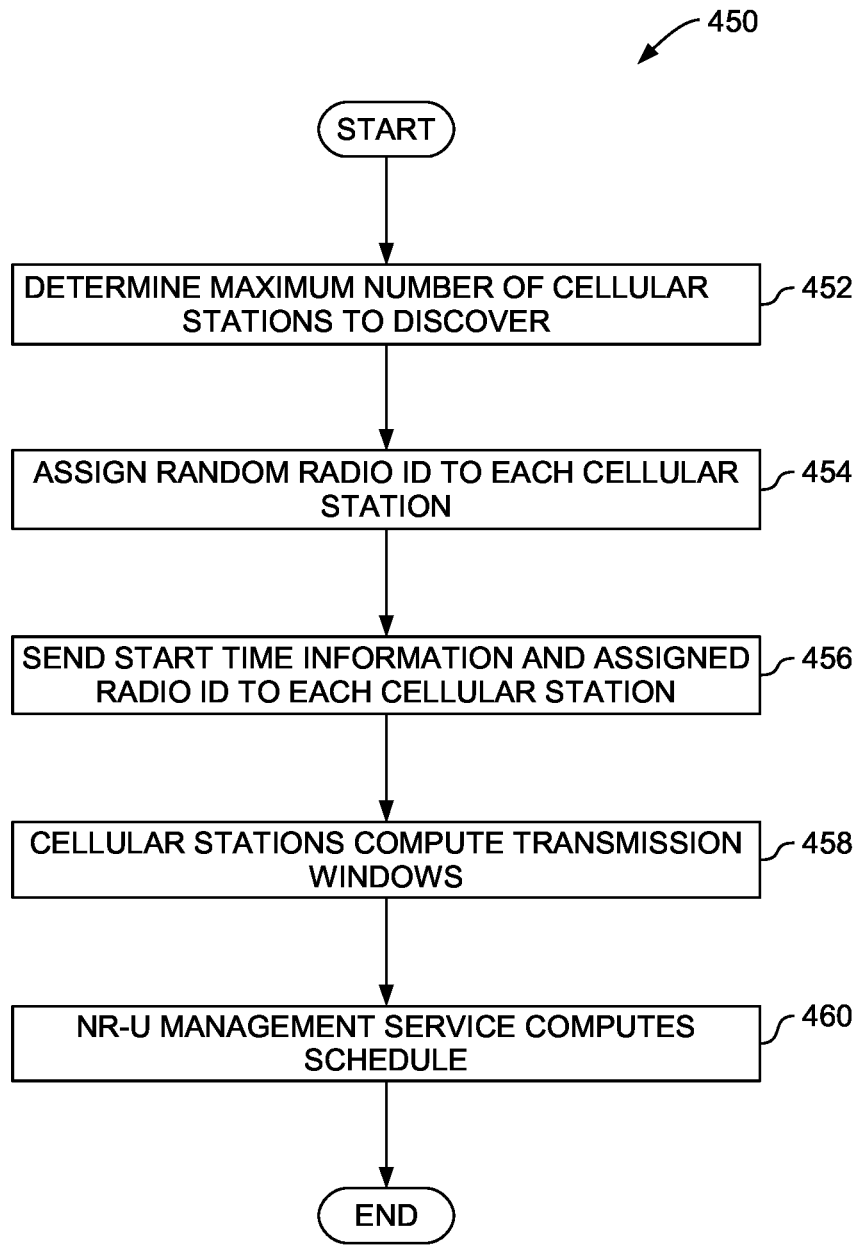
FIG. 4B is a flowchart illustrating setting a schedule for cellular transmission as part of neighborhood management between WiFi and unlicensed spectrum radios, according to one embodiment

FIG. 4B is a flowchart 450 illustrating setting a schedule for cellular transmission as part of neighborhood management between WiFi and unlicensed spectrum radios, according to one embodiment. At block 452 an NR-U management service (e.g., the NR-U management service 140 illustrated in FIGS. 1 and 2) determines the maximum number of cellular stations to discover, N. In an embodiment, the NR-U management service can seek to discover all cellular stations that are potential neighbors. This number can be determined, for example, using one or more radio management components (e.g., radio management 150) associated with the NR-U management service.

For example, the NR-U management service can retrieve a total number of relevant cellular stations from radio management components over a backhaul (e.g., the common backhaul 110 illustrated in FIG. 1). Alternatively, or in addition, the NR-U management service can divide the total number of relevant cellular stations into groups, and can set the maximum number of cellular stations to the size of a group. As discussed above in relation to block 414, setting the maximum number of stations, N, to a smaller value can improve accuracy by increasing the scheduled transmission window for each cellular station.

At block 454, the NR-U management service assigns a random radio identifier x to each cellular station being discovered. In an embodiment, the random radio identifier x is a random number between zero and the maximum number of stations to be discovered.

At block 456, the NR-U management service sends the start time (e.g., the time $T_0$ during which scheduled transmissions can begin) and the relevant random radio identifier (e.g., the identifier x assigned to the relevant cellular station) to each cellular station. Further, the NR-U management service can send to each cellular station the number of radios to be discovered, N, and the maximum epoch time for neighborhood discovery D. Alternatively, the values for N and D can be provided to the cellular stations in any other suitable manner (e.g., by an administrator or by another network component). In an embodiment, the NR-U management service can communicate with the cellular stations through a suitable backhaul (e.g., the common backhaul 110 illustrated in FIG. 1). In an embodiment, the NR-U management service communicates with the backhaul using a wired connection (e.g., an Ethernet connection). Alternatively, or in addition, the NR-U management service communicates with the backhaul using a suitable wireless connection.

At block 458 the cellular stations compute the transmission windows. In an embodiment, each cellular station can compute its transmission window using the start time $T_0$ and the random identifier x, along with the maximum number of stations to discover and the total epoch for neighborhood discovery. For example, each cellular station can use the equation: $T_{start}=T_0+((D/N)*x)$ (e.g., in seconds). This is merely one example, and each cellular station can use any suitable technique(s).

Similarly, in an embodiment, each cellular station can compute its end time using the equation: $T_{end}=T_{start}+delta$. For example, delta can be a value between the minimum time needed for accurate measurement by an NR-U management service (e.g., a value set by an administrator) and the maximum window length permitted for each cellular station (e.g., DIN).

At block 460, the NR-U management service computes the schedule for each cellular station. In an embodiment, the NR-U management service uses the same techniques used by the cellular stations. For example, the NR-U management service can compute the start time for each cellular station as: $T_{start}=T_0+((D/N)*x)$. The NR-U management service can compute the end time as: $T_{start}+delta$.

In an embodiment, the techniques discussed above in relation to FIGS. 4A-B use temporal diversity to identify NR-U neighbors (e.g., compatible NR-U neighbors to a given WiFi radio). This is merely one example. Alternatively, or in addition, other distinguishing radio features can be used. For example, the NR-U management service can use frequency diversity (e.g., instead of, or in addition to, temporal diversity). NR-U radio transmissions can be limited to particular bands or channels for certain radios, allowing an NR-U management service to identify these NR-U radios using this frequency information.

Figure 5A:
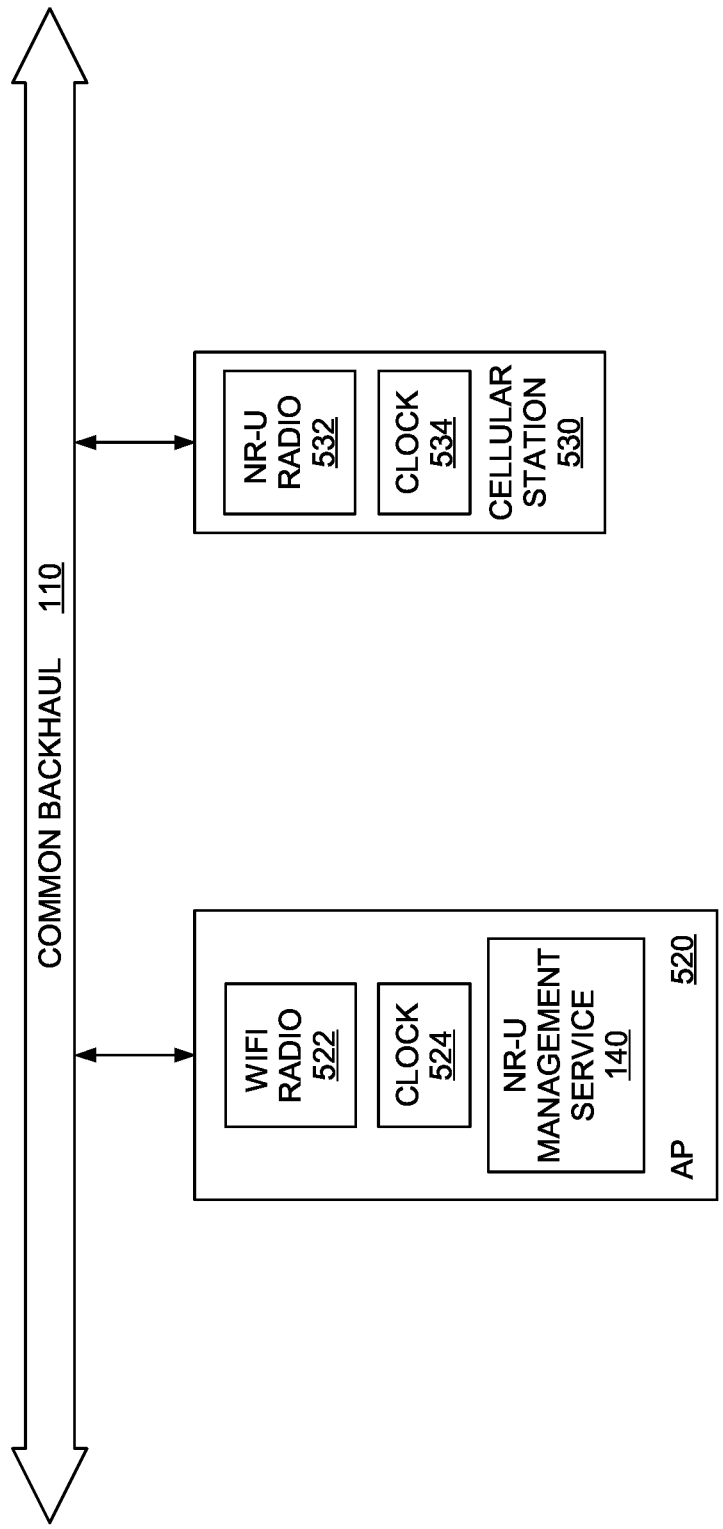
FIG. 5A illustrates synchronization between WiFi and unlicensed spectrum radios, according to one embodiment.

FIG. 5A illustrates synchronization between WiFi and unlicensed spectrum radios, according to one embodiment. In an embodiment, an AP 520 and a cellular station 530 are connected to a common backhaul 110. The AP 520 includes a WiFi radio 522 and an NR-U management service 140. The cellular station 530 includes an NR-U radio 532 and a clock 534. In an embodiment, the AP 520 can correspond with one of the APs 120A-C illustrated in FIG. 1, with the addition of illustrating the clock 524. The cellular station 530 can correspond with one of the cellular stations 130A-B illustrated in FIG. 1, with the addition of illustrating the clock 534.

In an embodiment, the cellular station 530 is a neighbor to the AP 520, and operates the NR-U radio 532 using at least a portion of unlicensed spectrum. For example, the NR-U management service 140 can use the techniques illustrated above in relation to FIGS. 4A-B to identify the cellular station 530 as a neighbor operating an unlicensed spectrum radio.

The clock 524 in the AP 520 may, however, not by synchronized with the clock 534 in the cellular station 530. For example, the clock 524 may be slightly ahead, or behind, the clock 534. This can reduce the effectiveness of neighborhood management and coordination between the AP 520 and the cellular station 530. In an embodiment, the NR-U management service 140 can identify the difference between the clock 524 in the AP 520 and the clock 534 in the cellular device 530, and can use this difference to accurately synchronize transmission between the devices (e.g., to avoid interference or other undesirable effects). This is discussed further below with regard to FIG. 5B.

Figure 5B:
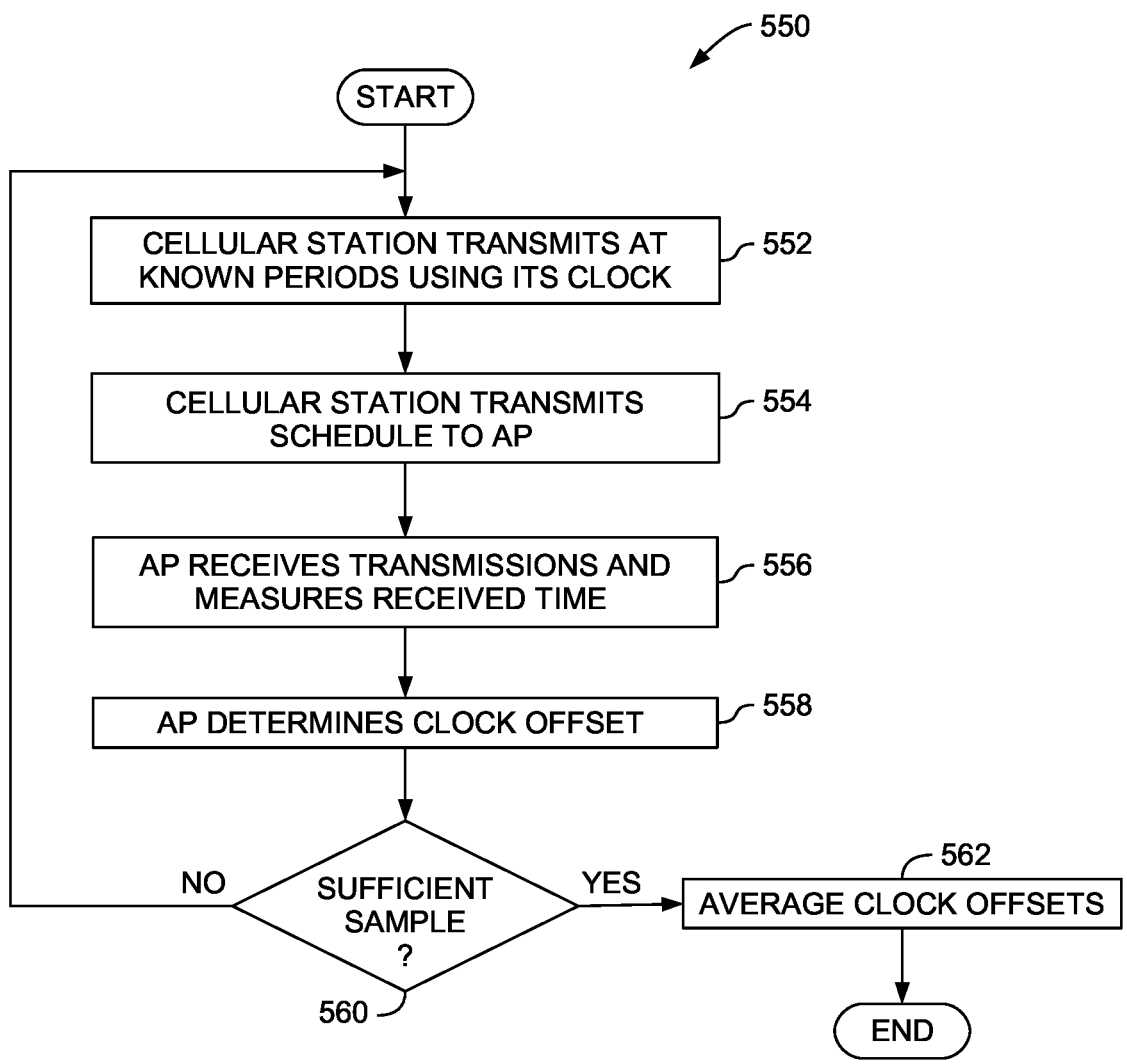
FIG. 5B is a flowchart illustrating synchronization between WiFi and unlicensed spectrum radios, according to one embodiment.

FIG. 5B is a flowchart 550 illustrating synchronization between WiFi and unlicensed spectrum radios, according to one embodiment. In an embodiment, the flowchart 550 corresponds with block 304 illustrated in FIG. 3. At block 552, a cellular device transmits at known periods using its clock. For example, the cellular station 530 illustrated in FIG. 5A can transmit using its NR-U radio 532 at known intervals, using its clock 534. In an embodiment, an NR-U management service (e.g., the NR-U management service 140 illustrated in FIG. 5A) receives these transmissions and identifies them as coming from an NR-U radio (e.g., based on an FFT signature).

At block 554, the cellular station transmits the schedule for its transmissions to the AP. For example, the cellular station 530 illustrated in FIG. 5A can transmit the schedule for its transmissions to the AP 520. In an embodiment, the cellular station 530 can transmit this schedule to the AP 520 using the common backhaul 110 (e.g., using a wired connection).

At block 556, the NR-U management service receives transmissions from the cellular station (e.g., wireless transmissions using the NR-U radio 532) and measures the received time. For example, the NR-U management service may be operating in the AP 520. The NR-U management service can use the clock 524 in the AP 520 to measure the time at which it receives transmissions from the NR-U radio 532.

At block 558, the NR-U management service determines the clock offset. For example, the NR-U management service can use the scheduled received at block 554 to identify the time at which the NR-U radio 532 was scheduled to transmit, and can compare that scheduled time with the received time for the transmission. The NR-U management service can determine the clock offset by comparing these times. For example, the NR-U management service can use the equation: clock-offset($CLK_{AP}$, $CLK_{NRU}$)=$time_{received}$−$time_{scheduled}$.

At block 560, the NR-U management service determines whether it has received a sufficient sample of transmissions (e.g., from the NR-U radio 532) to identify the clock offset. In an embodiment, the NR-U management service can determine the clock offset by averaging calculations across multiple transmissions received from the NR-U radio. This can reduce, or eliminate, errors based on individual transmissions. In an embodiment, the required sample size can be pre-set (e.g., by an administrator) or can be determined dynamically (e.g., based on a rate of change of the average across samples). If the NR-U management service determines that it has a sufficient sample of transmissions, the flow proceeds to block 562. If not, the flow returns to block 552 and the NR-U management service calculates the clock offset again.

At block 562, the NR-U management service averages the clock offsets determined at block 558. In an embodiment, the NR-U management service can determine a mean, a median, a weighted average (e.g., based on received signal strength or other properties of transmissions from the NR-U radio), or any other suitable average. The NR-U management service can then use the clock offset to accurately management transmissions between devices (e.g., between the WiFi radio 522 and the NR-U radio 532).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   collecting, at a wireless access point (AP) comprising a first WiFi radio, information relating to one or more neighbor devices comprising cellular radios;
   setting a schedule of transmissions for the one or more neighbor devices comprising cellular radios based on the collected information;
   identifying, at the AP, a neighboring second cellular radio operating using at least a portion of a new radio unlicensed (NR-U) radio spectrum, from among the one or more neighbor devices, wherein the identifying is based on a difference between a time that the AP receives a transmission from the second radio using a frequency within the NR-U radio spectrum and a time in the schedule, comprising:
      determining that the difference between the time that the AP receives the transmission from the second radio and the time in the schedule falls within a tolerance; and
   synchronizing transmission between the first radio and the second radio by identifying a clock offset between a first clock relating to the first radio and a second clock relating to the second radio, comprising:
      identifying the clock offset based on comparing a scheduled time for transmission by the second radio with a measured time relating to receipt of transmission by the second radio.

2. The method of claim 1, wherein the second radio comprises a 5G radio.

3. The method of claim 1, wherein setting the schedule of transmissions comprises:
   assigning a respective random identifier for each device in the one or more neighbor devices, wherein each device is configured to transmit at a time based on the random identifier.

4. The method of claim 3, further comprising:
   determining that a difference between the time that the AP receives the transmission from the second radio and the scheduled time does not fall within a tolerance, and in response determining a second transmission schedule for the one or more neighbor devices.

5. The method of claim 4, wherein determining the second transmission schedule for the one or more neighbor devices comprises:
   assigning a respective second random identifier for each device in the one or more neighbor devices, wherein each device is configured to transmit at a time based on the second random identifier.

6. The method of claim 1, wherein identifying, at the AP comprising the first radio, the neighboring second radio comprises:
   identifying the second radio as operating using the unlicensed radio spectrum using a fast Fourier transform (FFT) signature relating to the transmission.

7. A system, comprising:
   a processor; and
   a memory having instructions stored thereon which, when executed on the processor, performs an operation comprising:
      collecting, at a wireless access point (AP) comprising a first WiFi radio, information relating to one or more neighbor devices comprising cellular radios;
      setting a schedule of transmissions for the one or more neighbor devices comprising cellular radios based on the collected information;
      identifying, at the AP, a neighboring second cellular radio operating using at least a portion of a new radio unlicensed (NR-U) radio spectrum, from among the one or more neighbor devices, wherein the identifying is based on a difference between a time that the AP receives a transmission from the second radio using a frequency within the NR-U radio spectrum and a time in the schedule, comprising:
         determining that the difference between the time that the AP receives the transmission from the second radio and the time in the schedule falls within a tolerance; and
      synchronizing transmission between the first radio and the second radio by identifying a clock offset between a first clock relating to the first radio and a second clock relating to the second radio, comprising:
         identifying the clock offset based on comparing a scheduled time for transmission by the second radio with a measured time relating to receipt of transmission by the second radio.

8. The system of claim 7, wherein the second radio comprises a 5G radio.

9. The system of claim 7, wherein identifying, at the AP comprising the first radio, the neighboring second radio comprises:
   identifying the second radio as operating using the unlicensed radio spectrum using a fast Fourier transform (FFT) signature relating to the transmission.

10. A non-transitory computer-readable medium having instructions stored thereon which, when executed by a processor, performs an operation comprising:
    collecting, at a wireless access point (AP) comprising a first WiFi radio, information relating to one or more neighbor devices comprising cellular radios;
    setting a schedule of transmissions for the one or more neighbor devices comprising cellular radios based on the collected information;
    identifying, at the AP, a neighboring second cellular radio operating using at least a portion of a new radio unlicensed (NR-U) radio spectrum, from among the one or more neighbor devices, wherein the identifying is based on a difference between a time that the AP receives a transmission from the second radio using a frequency within the NR-U radio spectrum and a time in the schedule, comprising:
       determining that the difference between the time that the AP receives the transmission from the second radio and the time in the schedule falls within a tolerance; and
    synchronizing transmission between the first radio and the second radio by identifying a clock offset between a first clock relating to the first radio and a second clock relating to the second radio, comprising:
       identifying the clock offset based on comparing a scheduled time for transmission by the second radio with a measured time relating to receipt of transmission by the second radio.

11. The computer-readable medium of claim 10, wherein the second radio comprises a 5G radio.

12. The computer-readable medium of claim 10, wherein identifying, at the AP comprising the first radio, the neighboring second radio comprises:
    identifying the second radio as operating using the unlicensed radio spectrum using a fast Fourier transform (FFT) signature relating to the transmission.

13. The method of claim 1, further comprising:
    collecting, at the AP, information relating to a second one or more neighbor devices comprising cellular radios, based on a second schedule of transmissions;
    determining that the information relating to the second one or more neighbor devices is insufficient for identifying neighbors, and in response modifying the second schedule of transmissions; and
    identifying, at the AP, a neighboring third cellular radio operating using at least a portion of the NR-U radio spectrum, from among the second one or more neighbor devices, based on the modified second schedule of transmissions.

14. The system of claim 7, the operation further comprising:
    collecting, at the AP, information relating to a second one or more neighbor devices comprising cellular radios, based on a second schedule of transmissions;
    determining that the information relating to the second one or more neighbor devices is insufficient for identifying neighbors, and in response modifying the second schedule of transmissions; and
    identifying, at the AP, a neighboring third cellular radio operating using at least a portion of the NR-U radio spectrum, from among the second one or more neighbor devices, based on the modified second schedule of transmissions.

15. The non-transitory computer-readable medium of claim 10, the operation further comprising:
    collecting, at the AP, information relating to a second one or more neighbor devices comprising cellular radios, based on a second schedule of transmissions;
    determining that the information relating to the second one or more neighbor devices is insufficient for identifying neighbors, and in response modifying the second schedule of transmissions; and
    identifying, at the AP, a neighboring third cellular radio operating using at least a portion of the NR-U radio spectrum, from among the second one or more neighbor devices, based on the modified second schedule of transmissions.

* * * * *